United States Patent
Snyder et al.

(10) Patent No.: US 7,650,344 B2
(45) Date of Patent: Jan. 19, 2010

(54) SYSTEM AND METHOD OF MANAGING SOFTWARE PRODUCT-LINE CUSTOMIZATIONS

(75) Inventors: James Snyder, Cedar Park, TX (US); Harry Lai, Overland Park, KS (US); Shirish Reddy, East Marredpally (IN); Jimmy Wan, Austin, TX (US)

(73) Assignee: Coremetrics, Inc., San Mateo, CA (US)

( * ) Notice: Subject to any disclaimer, the term of this patent is extended or adjusted under 35 U.S.C. 154(b) by 633 days.

(21) Appl. No.: 11/053,743

(22) Filed: Feb. 8, 2005

(65) Prior Publication Data
US 2005/0267889 A1 Dec. 1, 2005

Related U.S. Application Data

(60) Provisional application No. 60/542,921, filed on Feb. 9, 2004.

(51) Int. Cl.
*G06F 17/30* (2006.01)
(52) U.S. Cl. .............................. 707/100; 707/3; 707/101
(58) Field of Classification Search ..................... 707/3, 707/100, 101
See application file for complete search history.

(56) References Cited

U.S. PATENT DOCUMENTS

| | | |
|---|---|---|
| 6,502,102 B1 | 12/2002 | Haswell et al. |
| 6,523,027 B1 | 2/2003 | Underwood |
| 6,601,233 B1 | 7/2003 | Underwood |
| 6,606,744 B1 | 8/2003 | Mikurak |
| 6,609,128 B1 | 8/2003 | Underwood |
| 6,633,878 B1 | 10/2003 | Underwood |
| 6,636,860 B2 * | 10/2003 | Vishnubhotla ............... 707/100 |
| 6,671,818 B1 | 12/2003 | Mikurak |
| 6,704,873 B1 | 3/2004 | Underwood |
| 6,725,446 B1 | 4/2004 | Hahn et al. |
| 6,745,185 B2 | 6/2004 | Lee et al. |
| 6,985,912 B2 * | 1/2006 | Mullins et al. ........... 707/103 R |
| 2002/0032768 A1 * | 3/2002 | Voskuil ....................... 709/224 |
| 2002/0065828 A1 * | 5/2002 | Goodspeed ................. 707/100 |
| 2002/0156792 A1 * | 10/2002 | Gombocz et al. ........... 707/100 |
| 2003/0004961 A1 * | 1/2003 | Slothouber et al. .......... 707/100 |
| 2003/0033311 A1 * | 2/2003 | Skinner ...................... 707/100 |
| 2003/0036876 A1 * | 2/2003 | Fuller et al. ................. 702/127 |
| 2003/0061225 A1 * | 3/2003 | Bowman et al. ............. 707/100 |
| 2003/0084053 A1 * | 5/2003 | Govrin et al. ............... 707/100 |
| 2003/0088573 A1 * | 5/2003 | Stickler ...................... 707/100 |
| 2003/0097365 A1 * | 5/2003 | Stickler ...................... 707/100 |
| 2003/0120502 A1 | 6/2003 | Robb et al. |
| 2003/0120593 A1 | 6/2003 | Bansal et al. |
| 2003/0120670 A1 * | 6/2003 | Nareddy et al. ............. 707/100 |
| 2003/0135509 A1 * | 7/2003 | Davis et al. ................. 707/100 |
| 2003/0233366 A1 * | 12/2003 | Kesselman et al. .......... 707/100 |
| 2004/0010505 A1 * | 1/2004 | Vishnubhotla ............... 707/100 |

OTHER PUBLICATIONS

US 6,718,525, 04/2004, Shey et al. (withdrawn)

* cited by examiner

*Primary Examiner*—Don Wong
*Assistant Examiner*—Kim T Nguyen
(74) *Attorney, Agent, or Firm*—Townsend and Townsend and Crew LLP

(57) ABSTRACT

A method of managing application service provider product line variations is disclosed. The method includes receiving a client customization request, creating a configuration managed file tailored to the client customization request, binding the configuration managed file to at least one customizable resource, and deploying the customizable resource to a data store. The customizable resource is instantiated after disposition at the data store.

3 Claims, 8 Drawing Sheets

SYSTEM AND METHOD OF MANAGING SOFTWARE PRODUCT-LINE CUSTOMIZATIONS

CROSS-REFERENCE TO RELATED APPLICATION(S)

The present application claims priority from U.S. provisional patent application No. 60/542,921, filed Feb. 9, 2004, entitled "SOFTWARE PRODUCT LINE SUPPORT IN COREMETRICS OA2004," which is assigned to the current assignee hereof and incorporated herein by reference in its entirety.

BACKGROUND

1. Field of the Disclosure

This application is generally related to software system product line support, particularly towards systems and methods for handling client customization requests.

2. Description of the Related Art

Recently, the online analytics space has gone through rapid changes. For example, online marketing analytics, is a method by which companies track their services or products on the internet to determine various marketing statistics regarding their customers to develop more effective methods to market their products or services. Initially, most analytics solutions were delivered using an Enterprise Software model. The Enterprise Software model was large and cumbersome, characterized by large acquisition and installation costs. At this point in time at least 70% of these first generation solutions were delivered using the Enterprise Software model. Using this model, only simple web server log file analyses were performed; essentially these system counted web server events and produced simple reports. Given that it was not clear what to measure, this model was suitable for a period of time even though it was not clear what business value was being gained.

The ensuing years required software providers to dramatically reduce costs while at the same time deliver demonstrable business value without significant customer investment or commitment. Beginning in late 2000, there was a shift in which, the solutions offered in this space were provided using the Application Service Provider (hereinafter, 'ASP') software model. Soon, the Enterprise Software model became antiquated driving the price required by software providers to dramatically decrease while requiring software providers to deliver a demonstrable business value without significant customer commitment. Using the ASP software model, costs were dramatically reduced while the capabilities of the solutions became much more complex and focused on business value where clear and measurable results could be shown.

While the above transformation was taking place, the demand for both a wholly out-sourced, lower cost, increased capability, and individually tailored solution became a primary requirement of customers in the online analytics space. Given the rapidly changing markets, each client company has unique reporting and analytic application requirements to become and remain competitive. Depending upon a company's organizational structure, variables such as product or service characteristics, enterprise data, and post-production activities need to be addressed by providing a degree of client customization that has not been previously addressed.

Present systems can provide a modicum of client customization. The present systems are capable of categorizing clients into major categories. Large numbers of customers are grouped together by industry segments. However, these systems are not capable of suitable client customization. Moreover, the present systems are cumbersome, having many hardware and software components. The present systems, because they are cumbersome are not capable of providing quick response client customization without client disruption or client down time. These systems resolve variations at system build time.

There exists a need for a software model and system that can provide a high degree of client customization and that allows for variation resolution in real time or near real time.

SUMMARY

In a particular embodiment, a method of managing application service provider product line variations is disclosed. The method includes receiving a client customization request, creating a configuration managed file tailored to the client customization request, binding the configuration managed file to at least one customizable resource, and deploying the customizable resource to a data store, wherein the customizable resource is instantiated after disposition at the data store.

According to another aspect, the disclosed method includes creating a configuration managed file tailored to a client customization request, binding the configuration managed file to a customizable resource, deploying the customizable resource to a data store creating a customized resource abstraction, and dynamically instantiating the customizable resource abstraction for use in an analytic platform services module.

In another embodiment a disclosed method of producing data is disclosed. The method includes storing a plurality of Internet transactions and identifying the transactions with an industry segment identifier and a client identifier, retrieving a plurality of customized resources responsive to a customer request, utilizing the plurality of customized resources to process the plurality of stored Internet transactions, the customized resources utilizing the industry segment identifier and the client identifier to aggregate data, and customizing a publishing module to produce subscriber focused data by organizing the aggregated data such that the data can be utilized by the subscriber.

According to another aspect, the disclosed method includes a data store including a plurality of customizable resources, an analytic platform services module having access to the data store, and a web publishing module having at least one input to receive content to be displayed. At least one of the plurality of customizable resources includes a variant aspect. The variant aspect is instantiated with data at the data store after a time of deployment of the customizable resources.

In a particular embodiment a system is disclosed that includes a data aggregation module, a data store in communication with the data aggregation module and an analytic application and reporting module in communication with the data store. The data store includes a plurality of customizable resources. The customizable resources provides functionality that is variant as a function of one of a particular industry and a particular client.

According to another aspect of the disclosed system, the system includes a data file associated with data of a data store. The data file is bound to a first collection of resources including a customizable component that is instantiated after a time of deployment. The first collection of resources defines a first scope of customization. The data file is further bound to a second collection of resources including a customizable component that is instantiated after a time of deployment. The second collection of resources defining a second scope of customization. The data file and the first and second collection of resources are loadable to a data store.

According to another aspect of the disclosed system, the system includes a partially defined resource having undefined customizable resources for use in a web application when instantiated at runtime, and an inheritance resolution mechanism defining the undefined customizable resources of the partially defined resource from customizable resource types of a broader scope.

According to another aspect of the disclosed system, the system presents customized data. The system includes a data store, a plurality of customized resources configured to retrieve data from the data store and a software selector module configured to select resources from the plurality of customized resources based on a client request during operation. The system also includes a navigation module configured to structure execution of the plurality of customized resources to create organized content, and a publishing module configured to receive the organized content and render the organized content into a customized display format.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWING(S)

Figure 1:
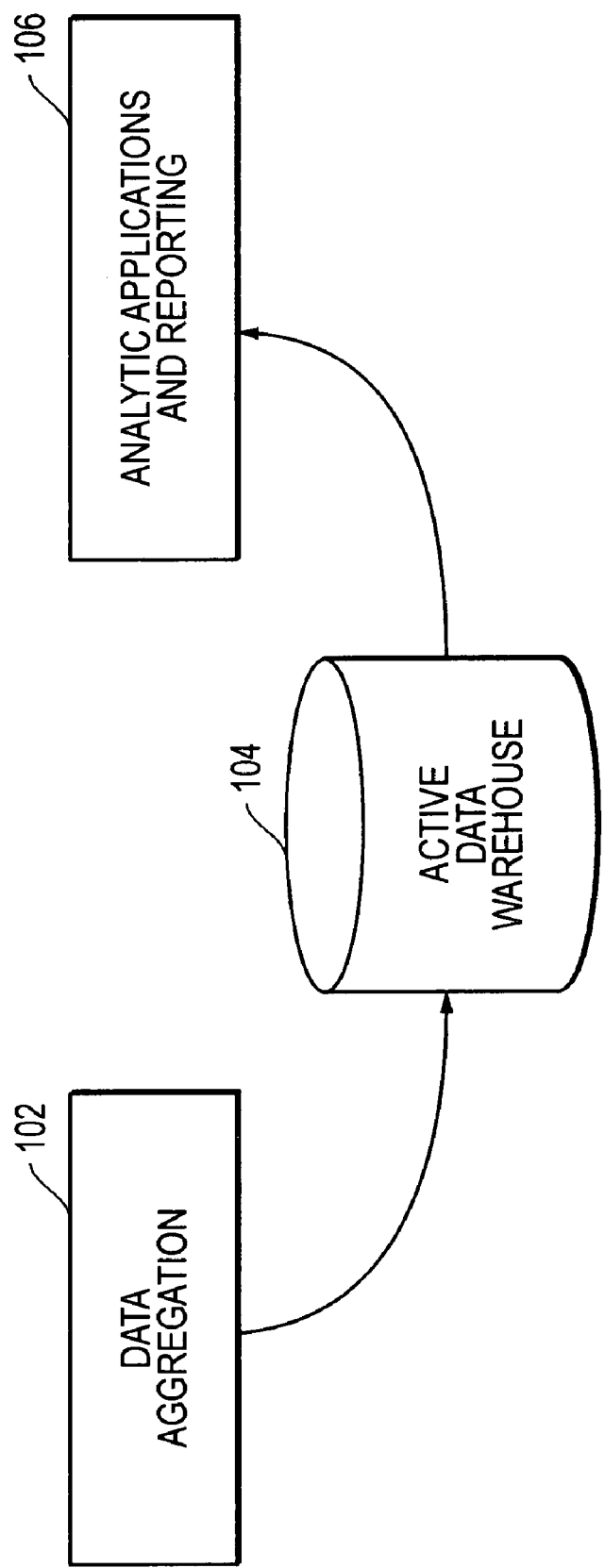
FIG. 1 is a general diagram of a software subsystem.

FIG. 1 illustrates an overview of software subsystems that is comprised of three components, the data aggregation subsystem 102, the active data warehouse 104, and the analytic applications and reporting subsystem 106. The data aggregation subsystem 102 collects real-time information from a client's web sites using third generation web analytics tagging technology. This information is then organized and added to an active data warehouse 104. An active data warehouse 104 is a data store with the capability of rendering continuous updates and customizations, not a read-only component. The benefit of providing such a system is that applications can be continually altered while clients are using them. The content from the active data warehouse 104 is then added to the analytic applications and reporting subsystem 106. The analytic applications and reporting subsystem 106 presents information stored within the active data warehouse 104 to the clients. The analytic applications and reporting subsystem 106 can also initiate specific analytic methods and is the client access point to all of the information. This is the area in which the majority of the client customization occurs.

Figure 2:
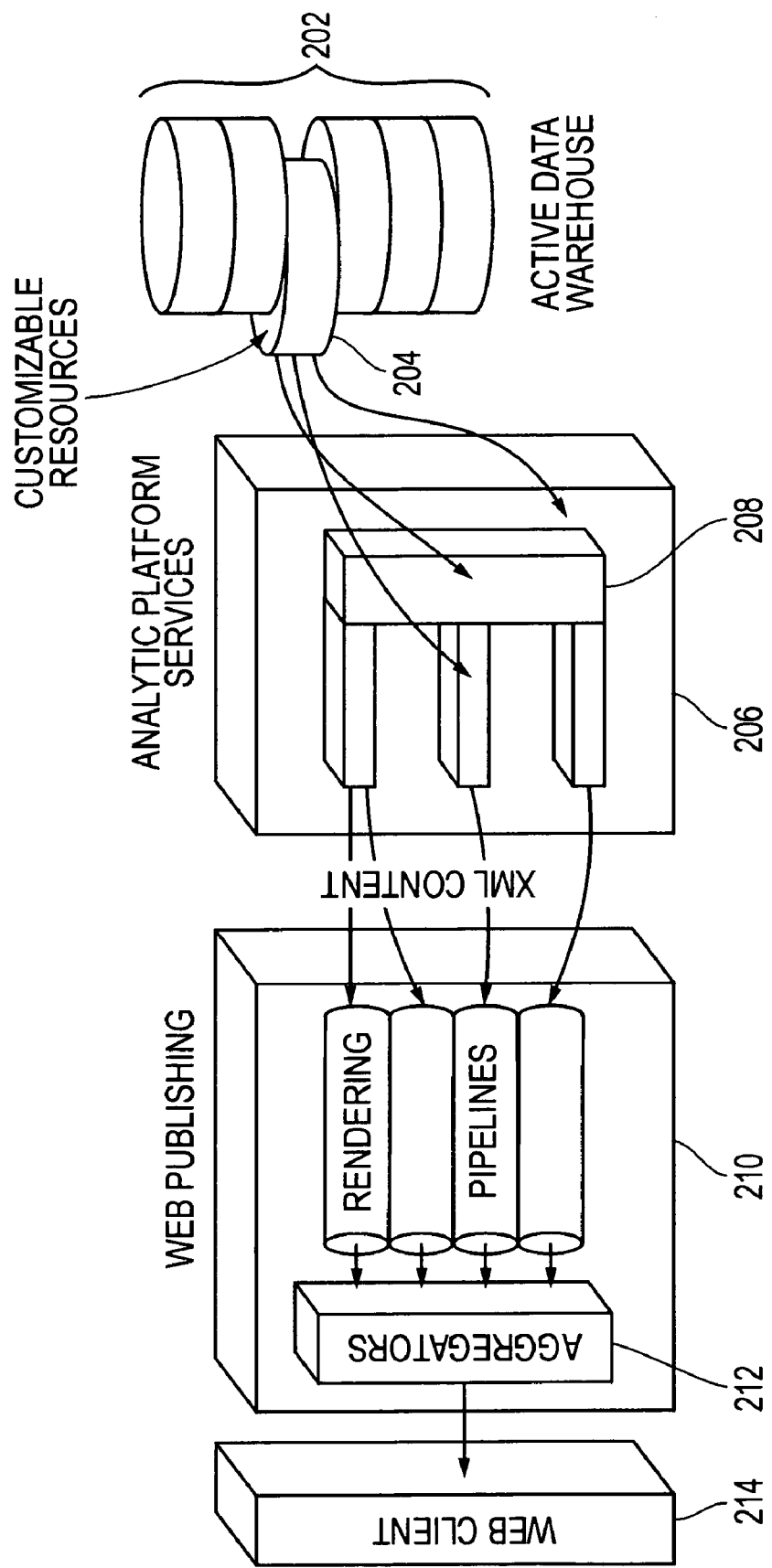
FIG. 2 is a block diagram that illustrates tiers of a rapid report deployment software system.

FIG. 2 illustrates a particular embodiment of a rapid report deployment software system (hereinafter 'RRD'). The system includes an active data warehouse 202 having multiple customizable resources 204. The customizable resources 204 are developed from one or more configuration managed files. The configuration managed files contain information requested by the client and reflect client requests to have their information formatted in a specific manner. The customizable resources may be deployed to a data store that is accessible to the analytic platform services module 206. When a resource is deployed, a resource abstraction is populated in the active data warehouse 202 using the configuration managed file contents. Resource abstractions exist in the active data warehouse 202 or in the runtime data structures of the RRD system. Deployment is the process of taking the contents of a bound file and writing it to a persistent representation of the customizable resource in the active data warehouse 202, or to a data store that is accessible to the analytic platform services module 206. Deployment bindings are a representation of the association between a resource and content found in a particular file.

The analytic platform services module 206 contains a service module 208 made up of a collection of modules. For example, the analytic platform services module 206 may include modules such as a reporting module, a security module, a navigation module, and a globalization module. The disclosed system may be used with other types of services and is not limited to the specific service modules described. Modules in the service module 208 serve to gather and format information from the subscriber-defined, customizable resources 204 that are received from the active data warehouse 202. The analytic platform services module 206 performs an inheritance instantiation or runtime binding on the information that is not already supplied by the customizable resources before the information is sent to the web publishing module 210. The inheritance instantiation is the last binding of the customized information based upon the vertical industry of the client to the content before the analytic platform services module 206 translates the complied customizable resources to XML format and transmits the information to the web publishing module 210.

The web publishing module as embodied in FIG. 2 produces subscriber focused data by organizing the aggregated data compiled by the aggregators 212. The aggregated data are output in such a manner as to be utilized by the subscriber or web client 214. The web publishing module may make use of a variety of frameworks, for example Cocoon2 opensource web publishing framework. It is desirable to select a web publishing rendering framework that matches the framework of the abstractions output by the analytic services module 206 in order to reduce modifications.

Figure 3:
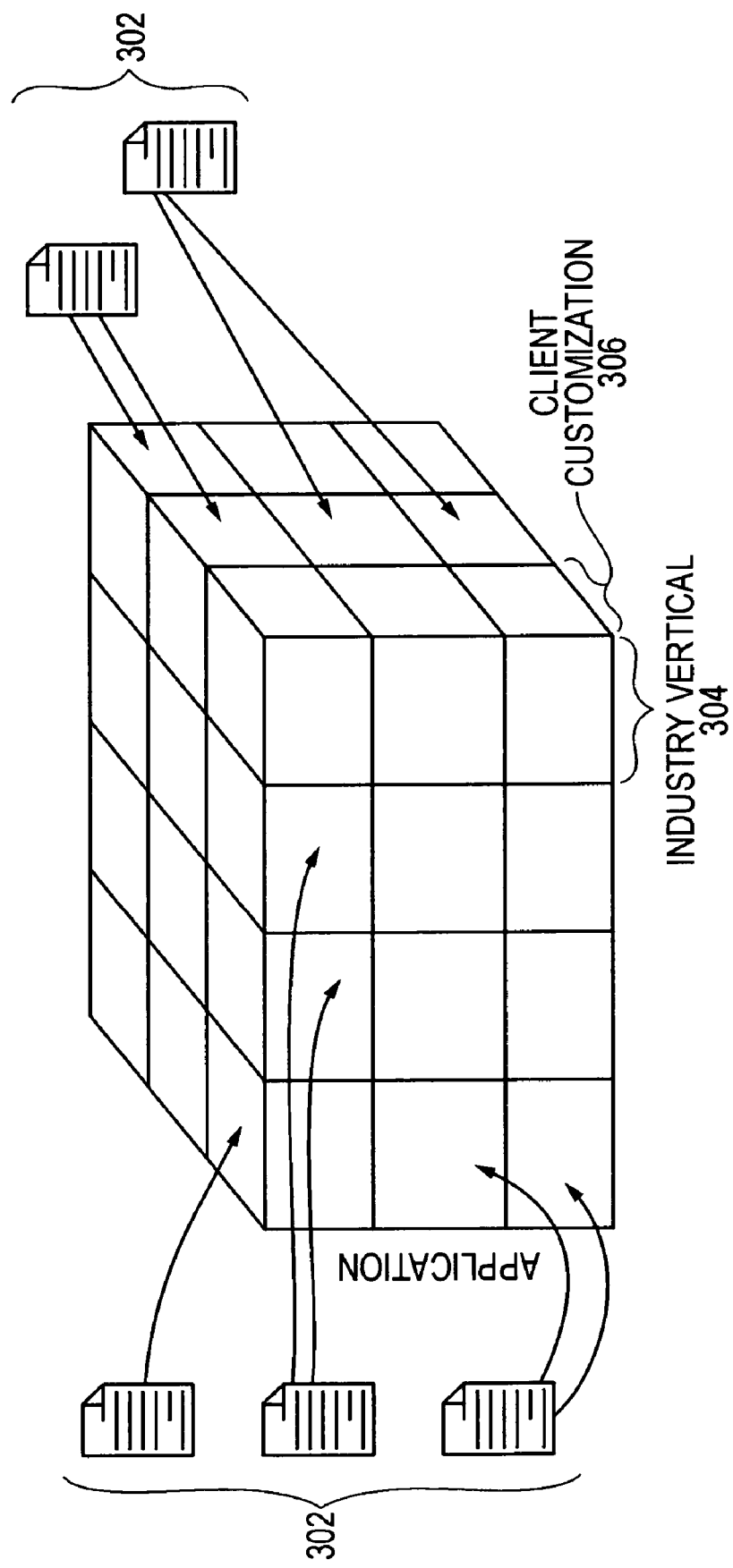
FIG. 3 is an illustration of a file binding with variations in scope.

Turning to FIG. 3, an embodiment of the variations in scope as well as the process of selective file binding to the variations in scope is shown. The three-dimensional box represents the three variables that are managed in a software system for complete client customization. To make explanation of the embodiment more convenient, assume that the Y-axis and X-axis represent the vertical and horizontal axes, respectfully, and the Z-axis is traveling through the page. In this embodiment, the application and industry vertical 304 dimensions, the Y-axis and the X-axis, are one scope while the application and client customization 306 dimensions, the Y-axis and the Z-axis, are the other scope. FIG. 3 shows that files 302 are bound to a particular cell in the three-dimensional space where a cell represents a collection of resources grouped together by scope. The industry vertical 304, as shown as the contents comprising the X-axis, is the scope utilized by the older systems, in which, typically, each client is categorized into one of three broad vertical scopes or industry segment identifiers. Some examples of a vertical scope or industry segment identifier includes the travel, retail and financial industries. The disclosed system and method is also suitable for use with other industries and is not limited to the particular verticals disclosed by way of example herein. Specifically, this embodiment offers the ability for a single file to be mapped to multiple resources in different scopes. The ability of binding a file 302 to a resource of a particular scope is a method of providing better client customization. The client customization 306 represents a new scope and the ability to offer a new degree of customization based upon a client's or subscriber's individual needs.

Figure 4:
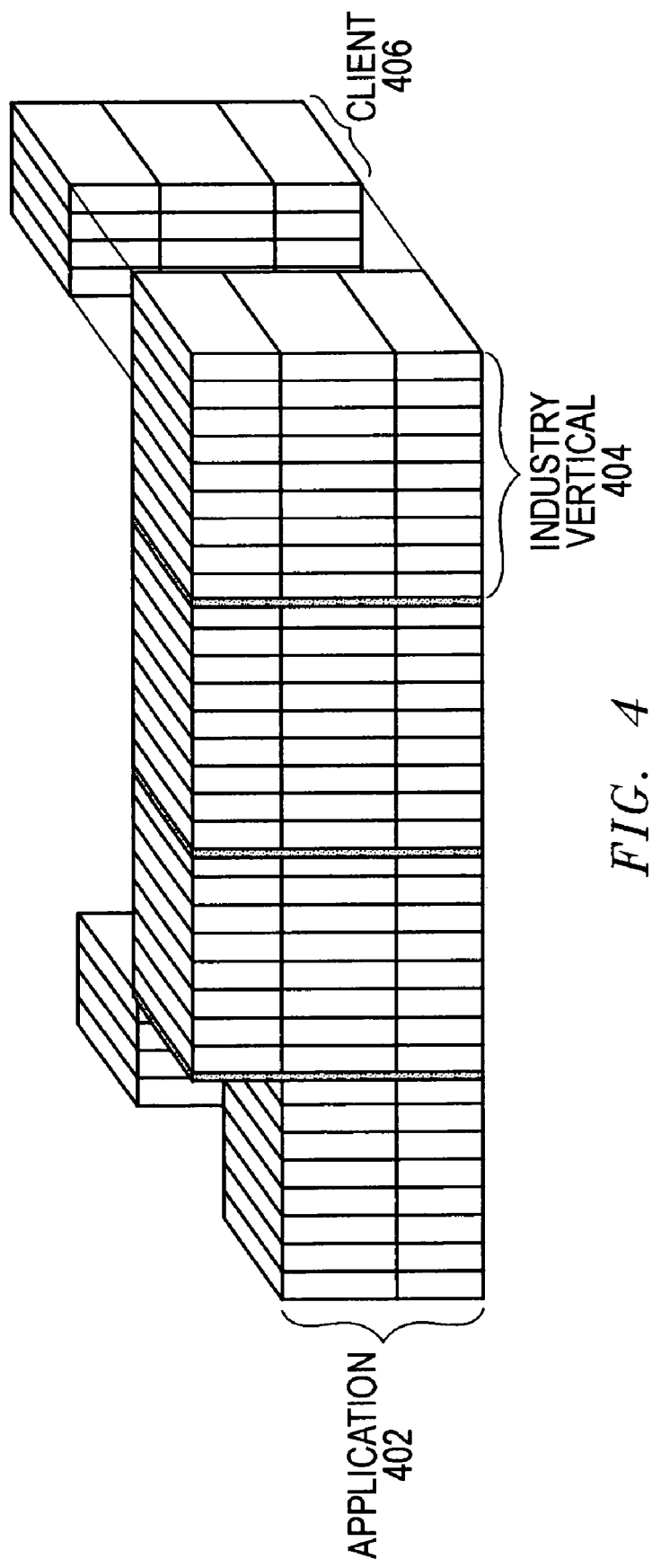
FIG. 4 is an illustration of the degrees of customization of a file binding.

The RRD platform also supports various forms of resource inheritance depending upon whether a resource is fully or partially defined. For fully defined resources, the resource is completely resolved when instantiated in the data store or active data warehouse for use in the analytic platform services module. For partially defined resources, the RRD platform provides additional inheritance resolution mechanisms that are invoked when a resource is instantiated at runtime. Such instantiation at runtime is called runtime inheritance binding or inheritance instantiation. For example, if the resource is not completely defined before instantiation from the active data warehouse, its logical parent or a resource bundle of the same name in a less specific scope is searched to completely resolve the resource upon instantiation in the analytic platform services module. For purposes of illustration, some examples of various types of resources, some having deployment binding and some with runtime binding are shown in Table 1 below:

The embodiment in FIG. 4 illustrates the inheritance aspect where each cell shown is considered a unique resource instance. As shown in FIG. 4 there are multiple cells or resource instances for each industry vertical and client. If, at runtime, a resource is partially defined at the client scope, inheritance resolution allows the system to provide the remaining undefined portion of the resource using a broader scope resource, such as the industry vertical. Notice that the scoping structure is preserved between FIG. 4 and FIG. 3. As shown in FIG. 4, resource redefinition via extension inheritance or inheritance binding causes two different kinds of variation. This approach allows the system to defer binding until after the RRD platform has been started, as well as rebind resources many times while the platform is running without disrupting client utilization. The system may repeat a bind, deploy, reinstantiate process much like an edit-compile-debug cycle.

Figure 5:
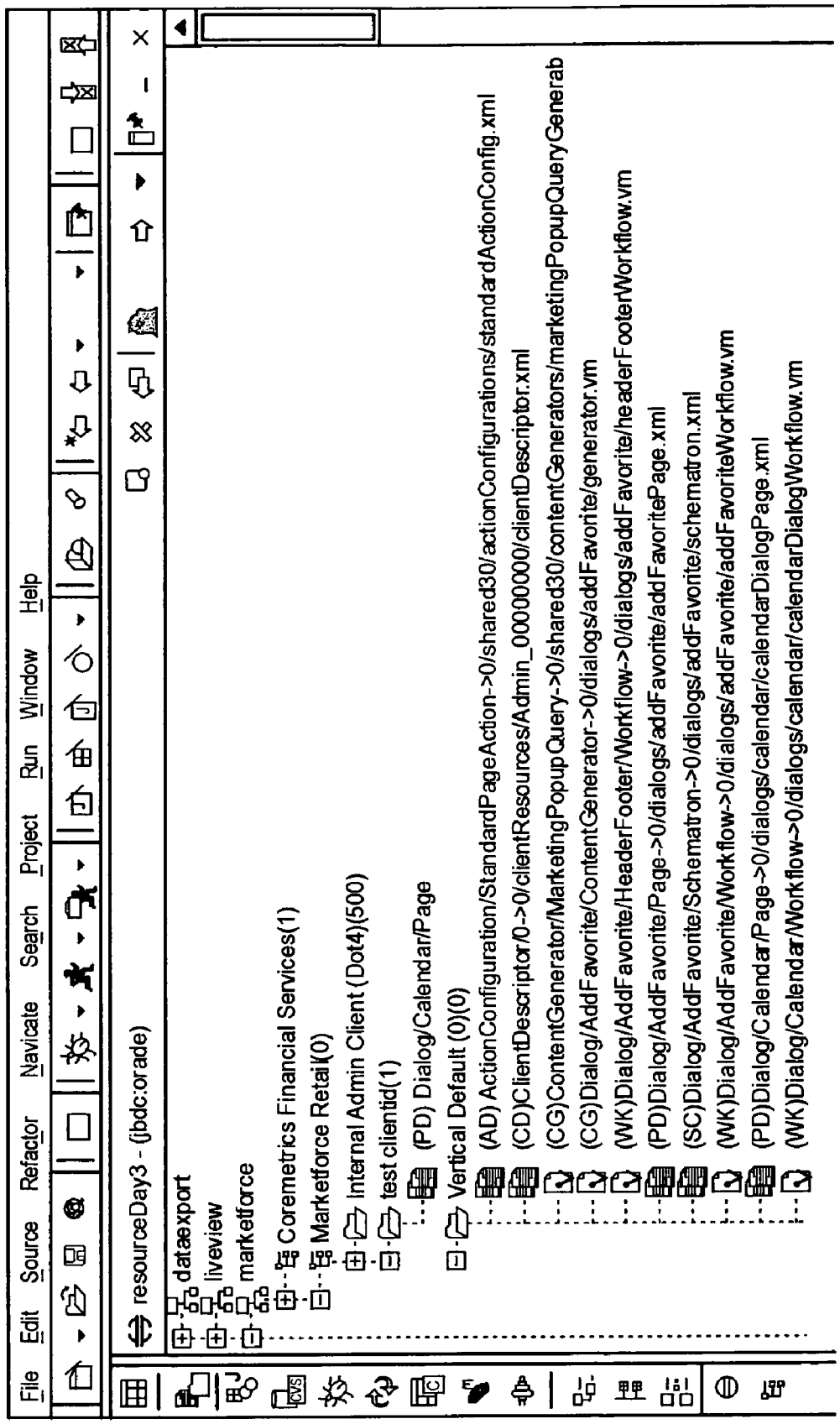
FIG. 5 is an illustration of rapid deployment content.

FIG. 5 presents a screen shot of the deployer program. The embodiment illustrates the scopes as a tree with the application being at the root. For example, the label "marketforce" and the two industry verticals shown under the root are retail and financial services. The embodiment illustrated by the deployer program in FIG. 5 also shows a resource bound to a particular file when the resource name is associated with a file name. Resource types, the content that comprises a customized resource, such as "clientDescriptor" and "schematron" are shown bound to individual files under the Vertical Default

TABLE 1

RRD Supported Customizable Resources

| Resource Type | Description | Deploy Tune Complete |
|---|---|---|
| ClientDescriptor | Defines the basic description of the bootstrap client resource configurations including navigational rules and workflow executions. | y |
| PageDescriptor | Page descriptors are a central, organizing concept in our architecture. They define the collection of resources that are used to generate content for a logical page. Page content can be dramatically variable depending upon the other resources it enlists to generate content, for example, references to work-flows, view layouts, resource bundles, page types, etc. Page Descriptors can optionally inherit definitions from Page Type Descriptors. | n |
| NavigationDescriptor | Provides a tree structured representation of logical application navigation points to page descriptor. | y |
| WorkflowTemplate | Workflow Templates act much like functions in programming languages in that they can accept variable numbers of arguments and invoke other work-flows or content generators. | y |
| ResourceBundle | The basic unit for supporting globalization and localization. Resource Bundles automatically inherit attributes from parent resource bundles in less specific scopes. | n |
| ContentGenerator | Content Generators are very similar to Workflow Templates in nature-with the key difference being the side-effect of evaluation is the item of interest, that is, the output of the content generator is returned as the invocation result. We can use content generator to build any kind of content we need from SQL Queries to complex XML documents. | y |
| RDLtemplate | Report Definition Language (RDL) Templates are a specialized content generators that have compiler support for solving the data source and layout binding problem. We generate a content generator using our RDL compiler. | y |
| SchematronSchema | To support complex user-interface form inputs, we support form validation using Schematron. | y |
| ViewTreeDescriptor | A View Tree Descriptor allows us to recursively describe hierarchical, spatial layout containment relationships. | y |
| PageTypeDescriptor | Page Type Descriptors allow us to create partially defined page descriptions that can be referenced by Page Descriptors. | y |
| ViewControllerTemplate | View Controller Templates allow us to provide specific layout resolution to composite view structures defined in our View Tree Descriptors. | y |
| SkinDescriptor | To support different styles of user interface aesthetic schemes, we define all of the substitutable parts for UI elements such as images and color schemes here. | y | branch. FIG. 5 further illustrates a resource Dialog/Calendar/Page as being defined by both the Vertical Default and the test client identification nodes.

Figure 6:
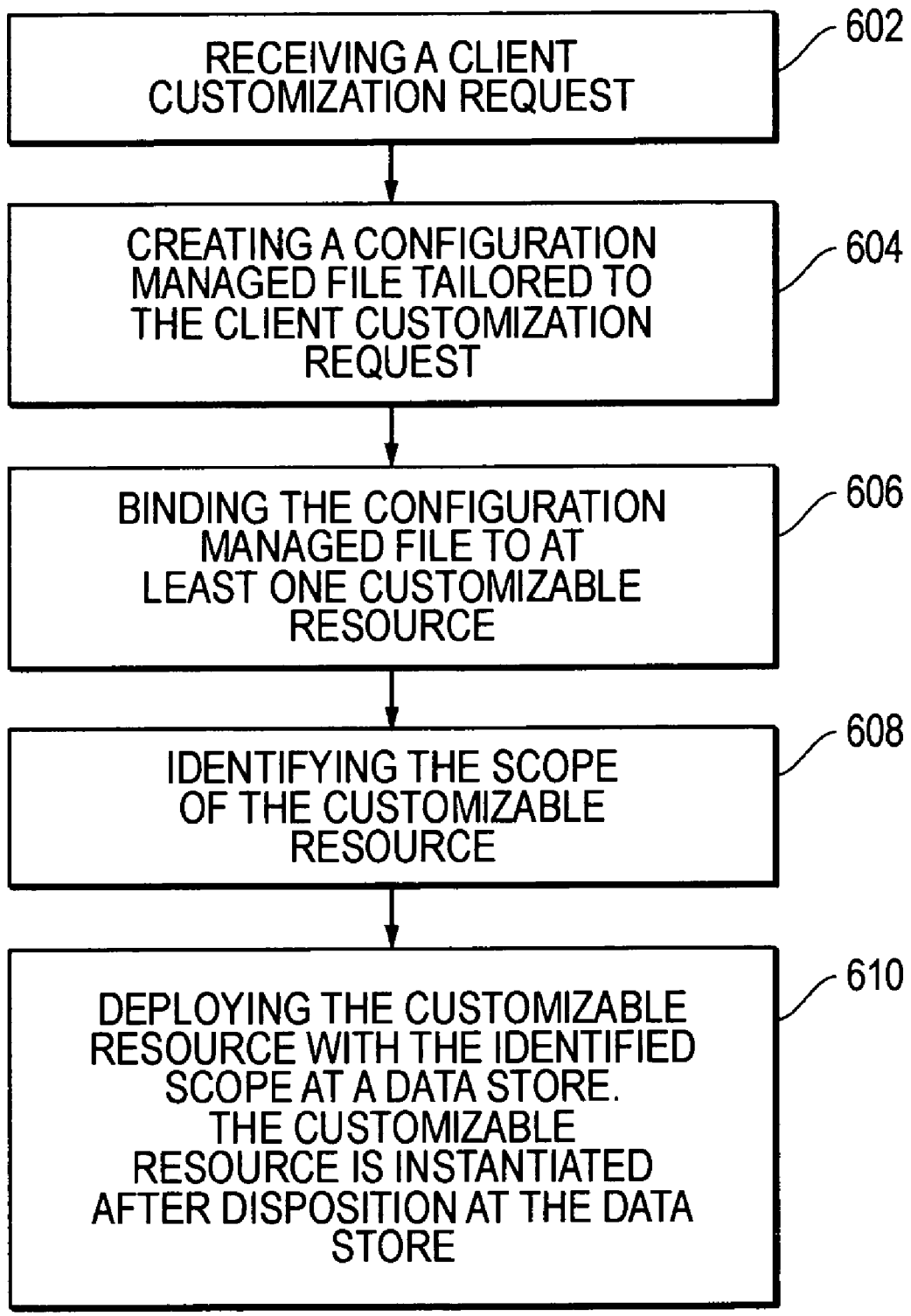
FIG. 6 is a flow chart that illustrates a method of managing product line variations.

FIG. 6 is a flow chart illustrating a particular method of an embodiment of managing application service provider (ASP) product line variations. Initially, as shown in block 602, the service provider receives a client customization request. The service provider then creates a configuration managed file tailored to the client customization request, at 604. The service provider binds the configuration managed file to at least one customizable resource 606 for deployment at the active data warehouse. The binding may involve binding a single file to multiple customizable resources such as client customizations or industry customizations or both. To identify the scope of the customizable resource, at 608, the system assigns a client scope or an industry scope to the customizable resource. The method further includes deploying the customizable resource with the identified scope to a data store, wherein a first portion of the customizable resource is instantiated upon disposition at the data store, at 610. The deploying process includes writing the bound configuration managed file to a persistent representation of the customizable resource in the active data warehouse. A portion of the resource that is not defined upon deployment to the active data warehouse may be instantiated at a later time. The later instantiation includes runtime binding or inheritance instantiation and may be performed using extension inheritance, whereby a partially defined resource is fully defined using content from a broader scope such as an industry vertical scope.

Figure 7:
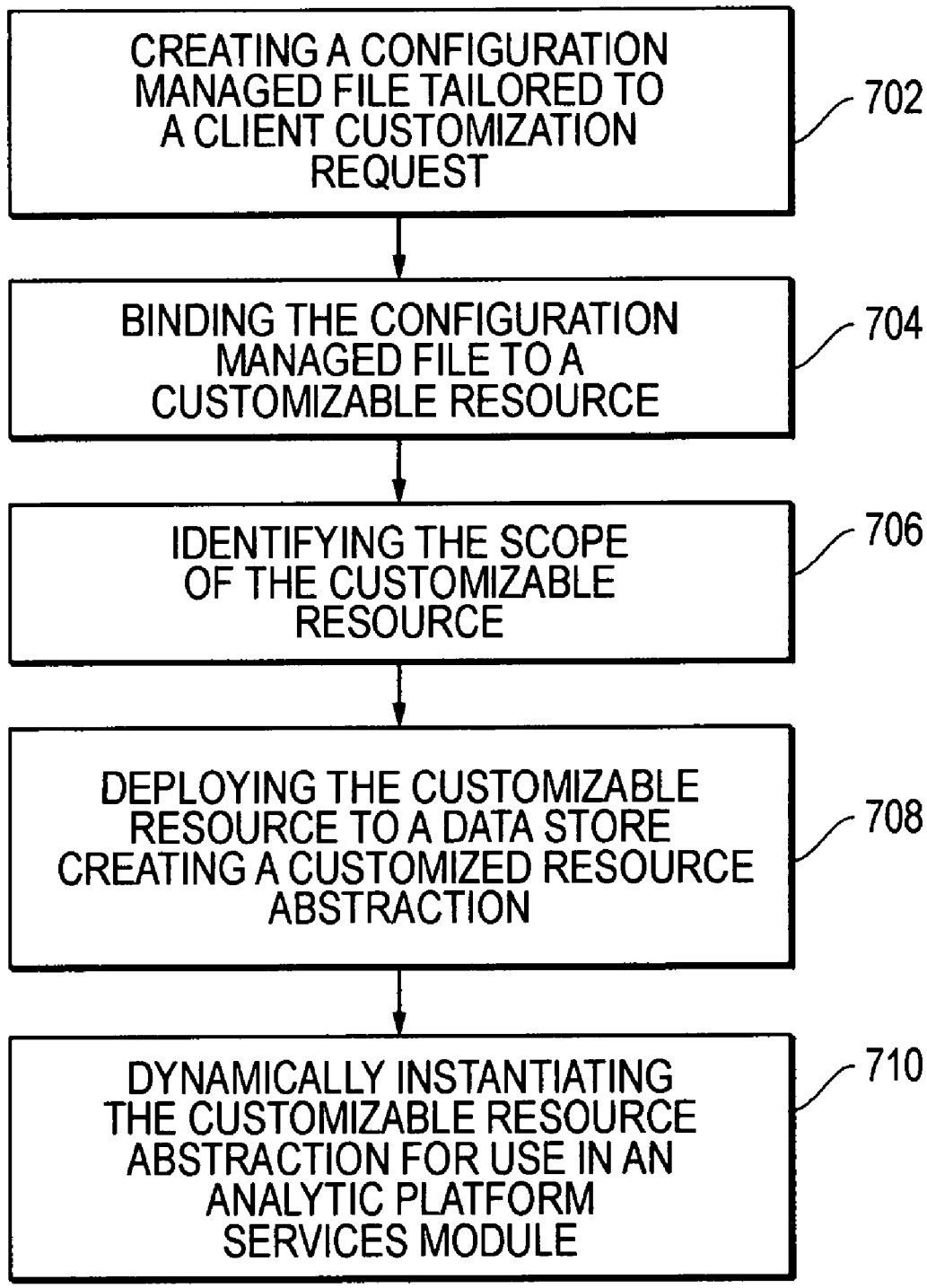
FIG. 7 is a flow chart that illustrates a method of using the system of FIG. 1 and FIG. 2

The flow chart illustrated in FIG. 7 depicts a particular embodiment of a method of the using the systems described herein. The method is initiated by creating a configuration managed file tailored to a client customization request, as shown in block 702. The method includes binding the configuration managed file to a customizable resource, at 704 and identifying a scope of the customizable resource, at 706. Further, the method includes deploying the customizable resource to a data store creating a customized resource abstraction, at 708. The method includes dynamically instantiating the customizable resource abstraction for use in an analytic platform services module, at 710. Dynamic instantiation includes instantiating a first portion of the customized resource at one time and a second portion of the customized resource at a second, later time. Typically, the first portion of the customized resource is instantiated at or after deployment to the active data warehouse. The second portion is instantiated upon communication to the analytic platform services module but before the content is displayed by a publishing module. The instantiation of the second portion is referred to as inherent instantiation or runtime binding.

Figure 8:
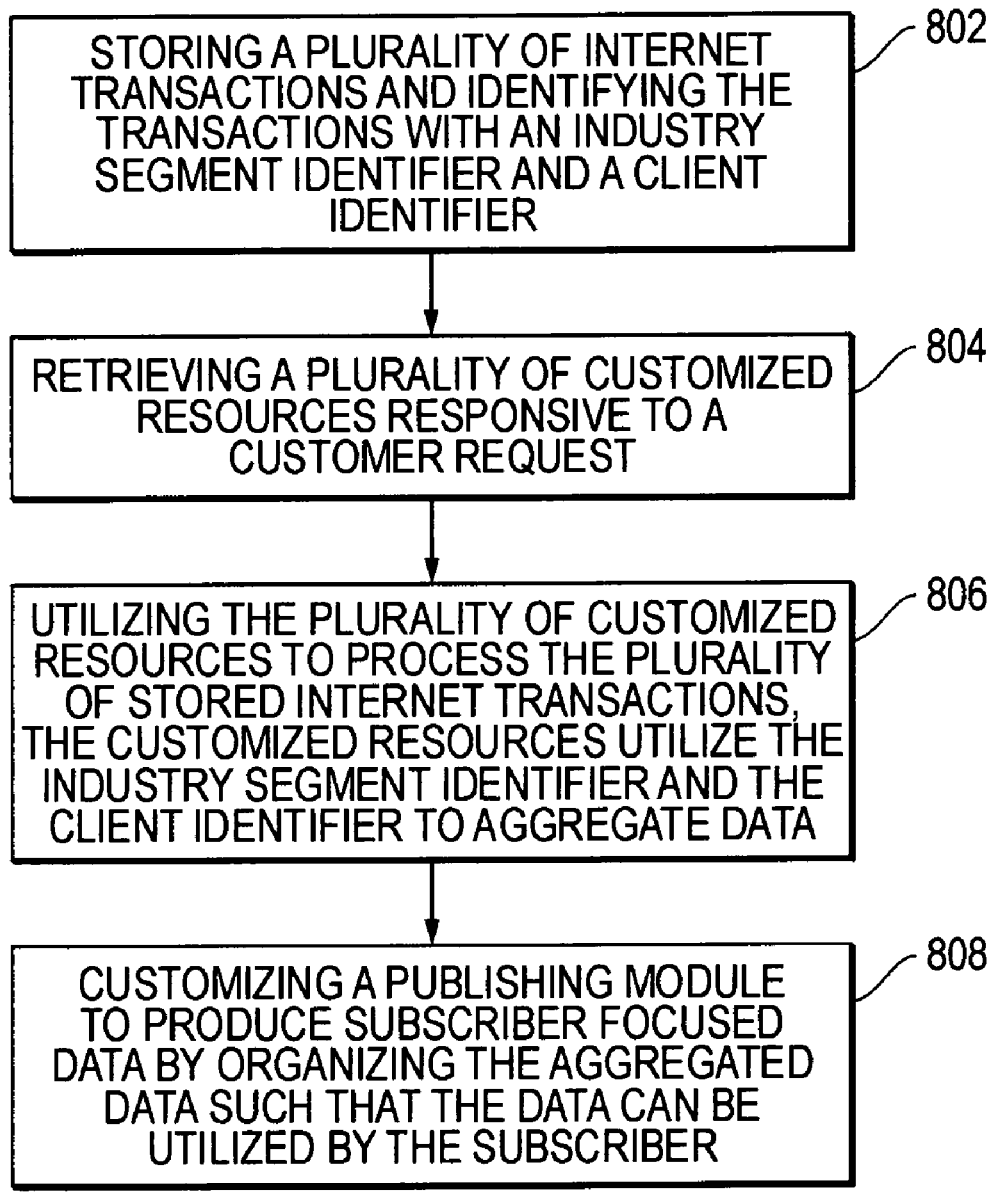
FIG. 8 is a flow chart that illustrates a method of producing data for use by the system of FIG. 1 and FIG. 2.

FIG. 8 illustrates a flow chart contemplating a particular embodiment of a method of producing data. Initially the method includes storing a plurality of internet transactions and identifying the transactions with an industry segment identifier and a client identifier, at 802. The step of storing a plurality of internet transactions includes tracking the subscriber's products or services on the internet and identifying the appropriate industry vertical or scope for that subscriber. The method then includes retrieving a plurality of customized resources responsive to a customer request, at 804. The step of retrieving a plurality of customized resources includes creating the configuration managed file based on the client's customization request and binding the file to at least one customized resource. The method also includes utilizing the plurality of customized resources to process the plurality of stored internet transactions. The customized resources utilize industry segments and the client identifier to aggregate data, at 806. The utilization of the industry segments includes determining the industry and client scope for the resource. For example, codifying the resource as a financial, retail or a travel industry segment. The method also includes customizing a publishing module to produce subscriber focused data by organizing the aggregated data such that the data can be utilized by the subscriber, at 808.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing web analytics application service provider client customization requests, the method comprising:

receiving a client customization request, wherein the client customization request specifies at least a partial customization to be performed on a customizable resource, wherein the customizable resource is used by an analytics application and reporting subsystem to generate a customized output report for a client, wherein the output report is generated by the analytics application and reporting subsystem and displayed on a client system;

creating a configuration managed file tailored to the client customization request, wherein the configuration managed file specifies how the customizable resource should be customized based on the client customization request;

binding the configuration managed file to the customizable resource, wherein binding the configuration managed file to the customizable resource comprises creating a resource abstraction of the customizable resource, wherein a resource abstraction is a persistent representation of the customizable resource with the client customization request applied to the customizable resource;

deploying the resource abstraction to a data store, wherein deploying the resource abstraction to a data store comprises storing the persistent representation of the resource abstraction in the data store;

receiving a client request for a customized output report;

retrieving the resource abstraction from the data store;

instantiating the resource abstraction in the analytics application and reporting subsystem, wherein instantiating the resource abstraction comprises creating a runtime data structure for the resource abstraction within the analytics application and reporting subsystem;

generating a customized output report in the analytics application and reporting subsystem using the instantiated resource abstraction;

sending the customized output report to a web publishing module; and sending the customized report from the web publishing module to the client system.

2. The method of claim 1, further comprising performing an inheritance instantiation on the runtime data structure, wherein inheritance instantiation comprises further customizing the runtime data structure based on an Industry Vertical of the client.

3. The method of claim 1, wherein a plurality of resource abstractions, for a plurality of clients, in a plurality of Industry Verticals are stored in the data store.

* * * * *